United States Patent [19]
Hicks

[11] Patent Number: 5,845,162
[45] Date of Patent: Dec. 1, 1998

[54] DATA RECORDING CAMERA WITH REMOVABLE RECORDER

[76] Inventor: Jonah Lee Hicks, P.O. Box 325, South Ozonepark, Queens, N.Y. 11420

[21] Appl. No.: 546,401

[22] Filed: Oct. 20, 1995

[51] Int. Cl.$^6$ .................................................... G03B 17/24
[52] U.S. Cl. .............................................................. 396/318
[58] Field of Search ...................................... 354/105, 106

[56] References Cited

U.S. PATENT DOCUMENTS 4,402,588  9/1983  Khait et al. .............................. 354/106

*Primary Examiner*—Howard B. Blankenship

[57] ABSTRACT

A data recording camera utilizes a keyboard mounted to an access door associated with the camera, and the keyboard inputs information to a light emitting diode array positioned within the camera. The light emitting diode array is removably attached between the camera's shutter and a bottom edge of a film frame to be exposed. The light emitting diode array is magnetically attached within the camera so as to be easily removable, and it includes light shielding means which isolates the bottom edge of a film frame from the rest of the film to be exposed during a conventional picture taking operation. A unique access door hinge is utilized to allow an electrical connector to be directed from the keyboard to the light emitting diode array.

5 Claims, 3 Drawing Sheets

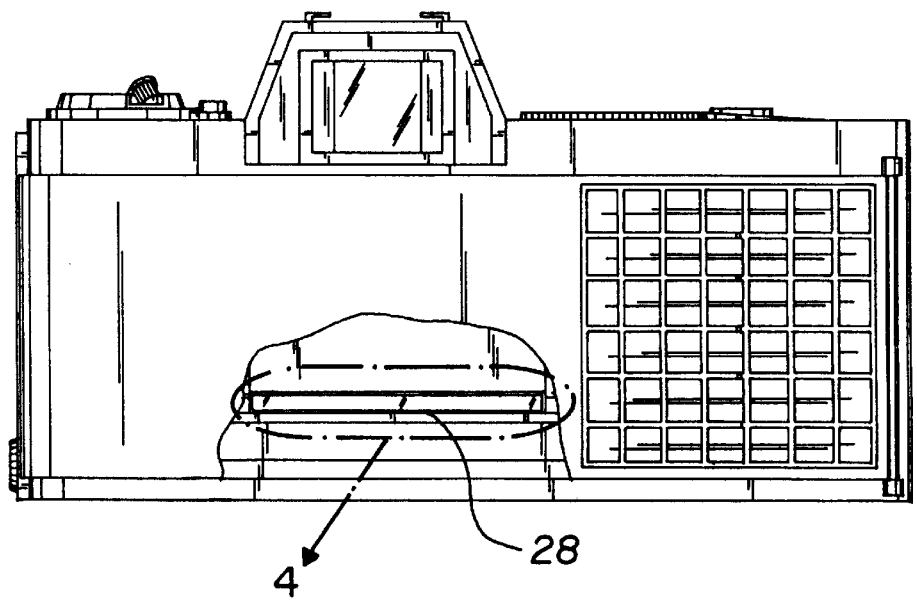
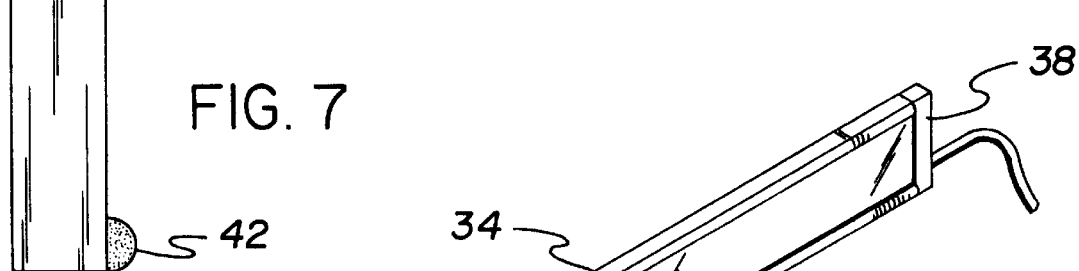
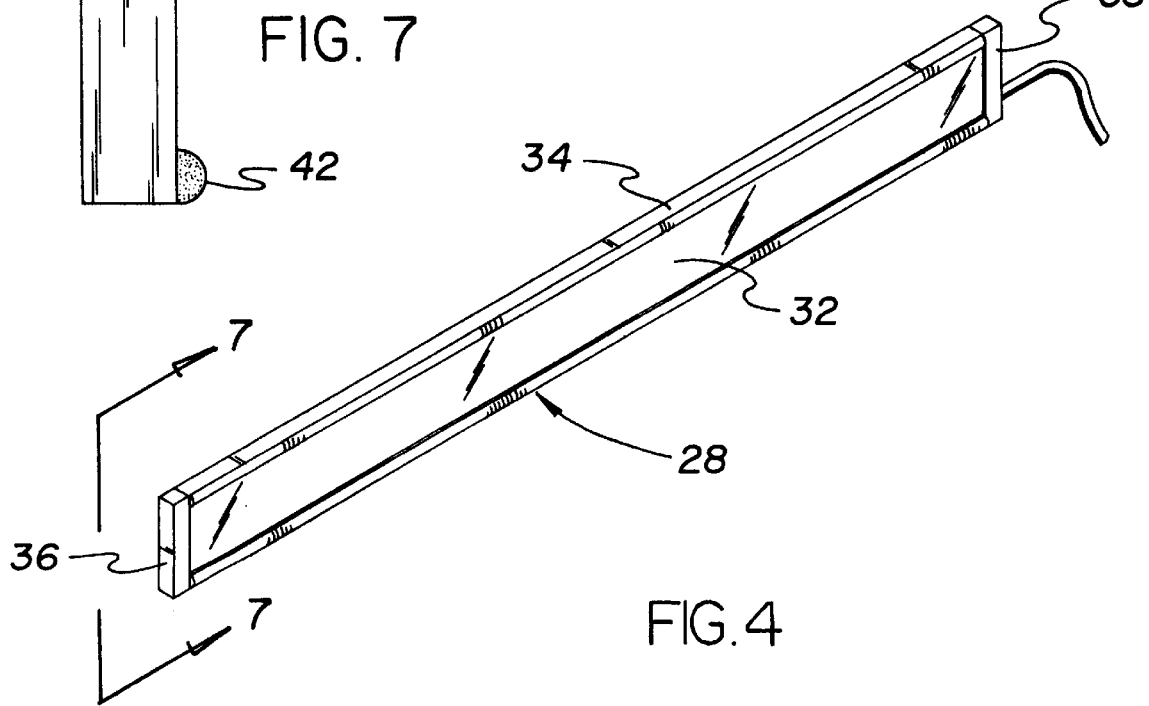

DATA RECORDING CAMERA WITH REMOVABLE RECORDER

BACKGROUND OF THE INVENTION

1. Field of the Invention

The present invention relates to cameras and more particularly pertains to a data recording camera for recording identification data on a bottom edge of a film frame within the camera.

2. Description of the Prior Art

The use of data recording cameras is known in the prior art. This is evidenced by the granting of a number of patents relating to various functional and structural aspects of data recording cameras. An example of known pertinent patents includes U.S. Pat. No. 4,268,143, which issued on May 19, 1981 to Dearing et al., wherein there is disclosed a camera provided with an illuminated display positioned behind the frame to be exposed, the display being contained within a space defined by the back of the film. One of the guide rollers that normally positions the film is divided to leave a gap at its center thus permitting a data image from the display to be recorded on a portion of the film near the edge of the frame that would otherwise be obscured.

Another example of a data recording camera is to be found in U.S Pat. No. 5,155,513, which issued on Oct. 13, 1992 to Matsumura et al., and which discloses a data imprinting device for a camera provided with a memory for previously storing a plurality of messages, an imprinting member receptive of a message stored in the memory for imprinting it on a photographic material, and a selection circuit for selecting one of a plurality of messages to be imprinted by the imprinting member.

A further example of a data recording camera is to be found in U.S. Pat. No. 5,278,610, which issued on Jan. 11, 1994 to Ishiwatari et al., wherein there is disclosed a rotary camera for photographing a plurality of original documents on microfilm and for recording information relating to the photographed original document together with data concerning the conditions for photographing additional necessary data. The data to be recorded is designated and is put into the control system through a keyboard.

Also of interest is U.S. Pat. No. 5,302,986, which issued on Apr. 12, 1994 to Kazami, wherein there is disclosed an information control apparatus in a camera with reproducing means for reproducing information prerecorded on film, recording means for recording information on the film, evaluation means for evaluating a state in which a signal is recorded on the film on the basis of the output state of the reproduction signal by the reproducing means, and control means for setting the recording condition of the recording means in conformity with the result of the evaluation by the evaluation means.

An even further example of a data recording camera is to be found in U.S. Pat. No. 4,705,372, which issued on Nov. 10, 1987 to Lapeyre, wherein there is disclosed a data processing system in a compact roll film type camera for recording information along the edge of a picture so as to present variable and manually entered data relating to the picture. This invention contains entirely within the camera cover both a keyboard and film recording equipment. The line of information is recorded by programming stored data for synchronous presentation along the edge of a frame when it is being moved to frame another picture.

A last pertinent data recording camera invention is to be found in U.S. Pat. No. 5,289,217, which issued on Feb. 22, 1994 to Rosenblatt, wherein there is disclosed a photograph identification system for use in recording descriptions and other pertinent information pertaining to a particular photograph. The identification employs a data entry device having a keyboard input for recording alphanumeric information. The data entry device is attached to the camera and is capable of receiving a signal from the camera flash terminal for indexing recorded information.

While each of these prior art patents disclose devices which fulfill their respective particular objectives and requirements, and are most likely quite functional for their intended purposes, it will be noticed that none of these patents disclose a data recording camera for selecting and manually entering in advance alphanumeric information on a bottom edge of a film frame prior to its exposure by an opening of the associated camera shutter.

As such, there apparently still exists the need for new and improved data recording cameras wherein information can be manually inputed in alphanumeric characters through the use of a keyboard attached to the camera, with this information being inputed prior to an actual utilization of the camera, whereby the complexity of designing and manufacturing a system for synchronous input of data, and the expense associated therewith, is eliminated. In this respect, the present invention substantially fulfills this need.

SUMMARY OF THE INVENTION

In view of the foregoing disadvantages inherent in the known types of data recording cameras now present in the prior art, the present invention provides a new data recording camera wherein the same can be utilized to prerecord identification data through the use of alphanumeric characters inputed by a keyboard attached to the camera. As such, the general purpose of the present invention, which will be described subsequently in greater detail, is to provide an improved data recording camera and method which has many of the advantages of the data recording cameras mentioned heretofore and many additional novel features that result in a data recording camera which is not anticipated, rendered obvious, suggested, or even implied by any of the prior art data recording cameras, either alone or in any combination thereof.

To attain this, the present invention generally comprises a data recording camera which utilizes a keyboard mounted to an access door associated with the camera, and the keyboard inputs information to a light emitting diode array positioned within the camera. The light emitting diode array is removably attached between the camera's shutter and a bottom edge of a film frame to be exposed. The light emitting diode array is magnetically attached within the camera so as to be easily removable, and it includes light shielding means which isolates the bottom edge of a film frame from the rest of the film to be exposed during a conventional picture taking operation. A unique access door hinge is utilized to allow an electrical connector to be directed from the keyboard to the light emitting diode array.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new data recording camera, and method opf using such camera, which has many of the advantages of the data recording cameras mentioned heretofore and many novel features that result in a data recording camera which is not anticipated, rendered obvious, suggested, or even implied by any of the prior art data recording cameras, either alone or in any combination thereof.

It is another object of the present invention to provide a new data recording camera which may be easily and efficiently manufactured and marketed.

It is a further object of the present invention to provide a new data recording camera which is of a durable and reliable construction.

An even further object of the present invention is to provide a new data recording camera which is susceptible of a low cost of manufacture with regard to both materials and labor, and which accordingly is then susceptible of low prices of sale to the consuming public, thereby making such data recording camera economically available to the buying public.

Still yet another object of the present invention is to provide a new data recording camera which provides in the apparatuses and methods of the prior art some of the advantages thereof, while simultaneously overcoming some of the disadvantages normally associated therewith.

Still another object of the present invention is to provide a new and improved data recording camera which facilitates the use of a means of prerecording identification data on the edge of a film frame prior to its exposure by an operation of the camera shutter.

Yet another object of the present invention is to provide a new and improved data recording camera which utilizes a removable identification data recording device within a camera wherein such device can be repositioned relative to film frame so as to allow the recording of data along a different edge of such film frame.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a rear elevation view of the camera.

FIG. 4 is a perspective view of the light emitting diode array forming a part of the present invention.

FIG. 7 is an end elevation view of the light emitting diode array forming a part of the present invention as viewed along the line 7—7 in FIG. 4.

DESCRIPTION OF PREFERRED EMBODIMENTS

Figure 1:
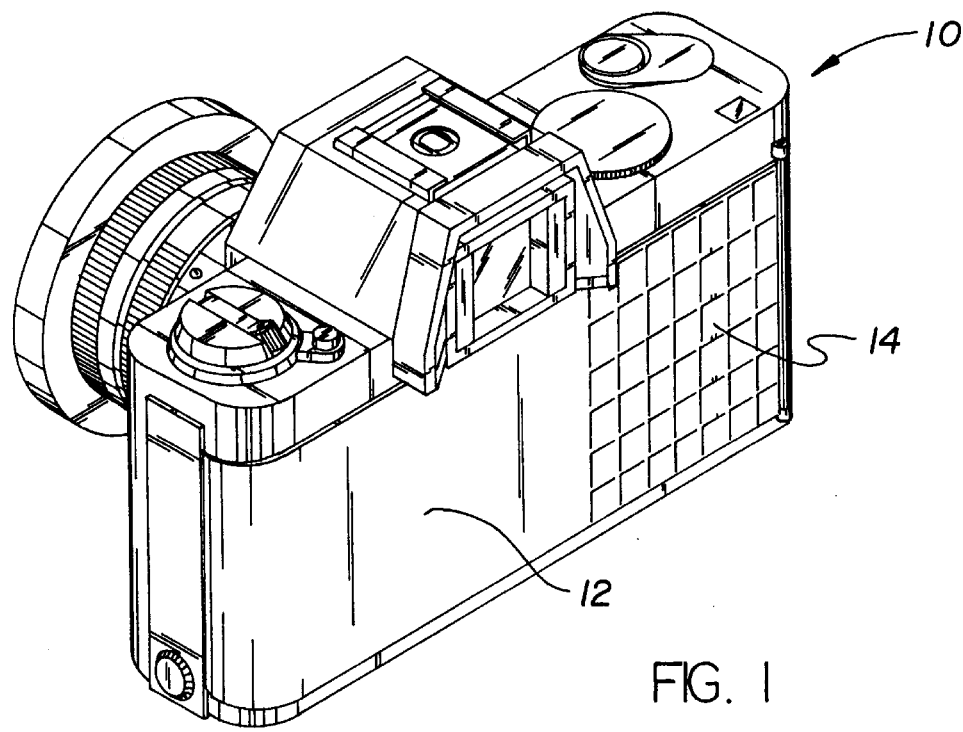
FIG. 1 is a perspective view of the data recording camera comprising the present invention.

With reference now to the drawings, and in particular to FIGS. 1–4, a new data recording camera embodying the principles and concepts of the present invention and generally designated by the reference numeral 10 will be described.

Figure 6:
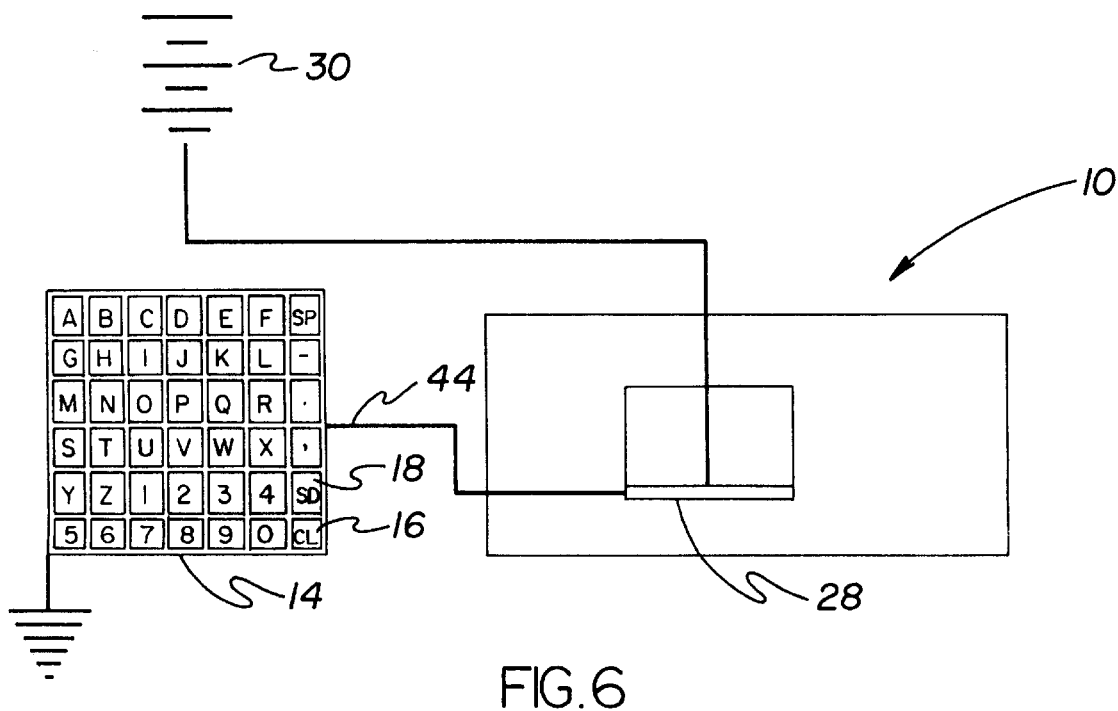
FIG. 6 is an electrical schematic of the invention.

More specifically, it will be noted that the data recording camera 10 is of a somewhat conventional design and exterior appearance, with the exception that its access door 12 is provided with a keyboard 14 which is fixedly secured thereto. The keyboard 14 is of a design similar to the type utilized on hand-held calculators and the like, and as shown in FIG. 6, it is provided with forty-two keys which include a complete set of alphanumeric characters, a "clear" key 16, and a "send" key 18.

Figure 2:
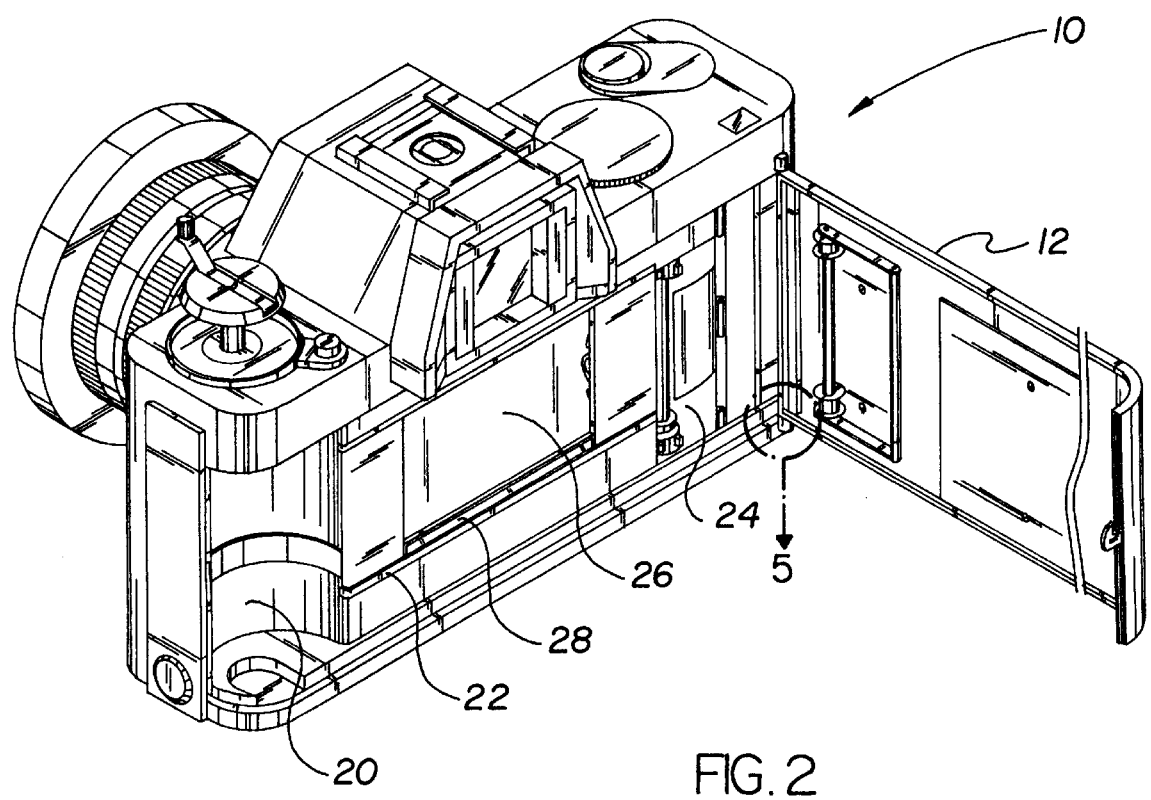
FIG. 2 is a perspective view of the invention showing the same with its access door in an opened positioned.

As shown in FIG. 2, when the access door 12 is in an opened position, a roll of film, which is not illustrated, may be positioned in a film receiving compartment 20 in a well understood manner, and a leader from the film is then passed through a film guide frame 22 prior to attachment to a take-up spool 24. A film frame window 26 defines a rectangular aperture through which light will pass to expose a particular frame of film when the shutter of the camera is actuated.

As best illustrated in FIGS. 2 and 3, a data recording device 28 is positioned at a bottom edge of the film frame window 26. The data recording device 28 is positionable between the shutter of the camera 10 and the film which will overlie the device when it is moved along the film guide frame 22. The data recording device 28 effectively comprises a light emitting diode array which is in electrical communication with a keyboard 14 and which functions somewhat similarly to a display on a hand-held calculator. With reference again to FIG. 6 of the drawings, it can be seen that the keyboard 14 is in electrical communication with the device 28, and electrical power is received from a camera battery 30.

FIGS. 4 and 7 of the drawings illustrate construction and design details of the light emitting diode array contained within the data recording device 28. More particularly, it can be seen that the array 28 is contained behind a protective transparent window 32 mounted in a frame structure 34. The frame structure 34 is of a rectangular shape and has magnets 36, 38 disposed on opposite ends thereof. The magnets 36, 38 allow the light emitting diode array 28 to be selectively positioned relative to a film frame within the camera 10, i.e., it can be magnetically attached to the existing film guide frame 22 either in a position to import data to a film frame along a bottom edge of the frame or along a top edge as desired.

The light emitting diode array 28 is further provided with a pair of longitudinally extending light shields 40, 42 which may consist of long strips of foam rubber covered by dark velvet-like material. The light shield strips 40, 42 are compressible against a frame of film without being damaging thereto, and they prevent an overexposure of a bottom edge of a film frame when the shutter of the camera 10 is actuated. The light shield strips 40, 42 can be removed from the light emitting diode array 28 when they become worn, and such removal is facilitated by the fact that the magnets 36, 38 allow the light emitting diode array to be easily removed from the camera 10 for purposes of maintenance and light shield strip repair or replacement.

Figure 5:
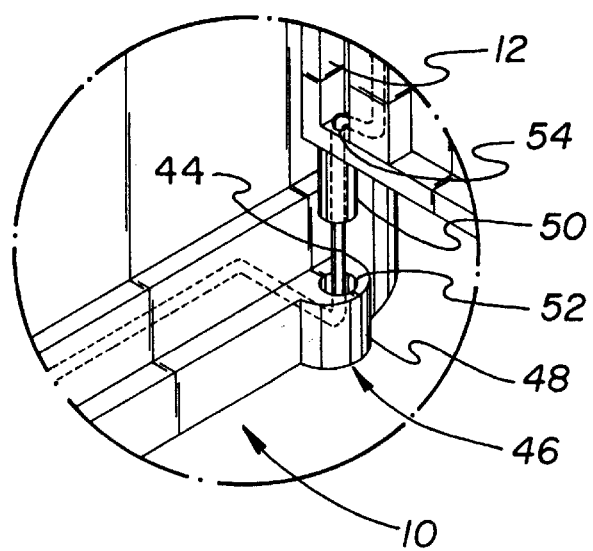
FIG. 5 is an enlarged detail view of the hinge assembly shown in FIG. 2.

With reference to FIGS. 2, 5, and 6, it can be seen that the keyboard 14 is electrically connected to the light emitting diode array 28 by an electrical lead 44. This flexible electrical lead 44 is directed through a hinge assembly 46 wherein such hinge assembly is part of the hinge structure utilized to allow the access door 12 to hingedly open and close relative to the camera 10. The hinge assembly 46 includes a tubular hollow first member 48 mounted to the camera 10 and a second tubular hollow member 50 which is attached to the access door 12. The second member 50 has an outside diameter which is slightly less than the diameter of an aperture 52 extending through the first member 48. As such, the member 50 is positionable within the aperture 52 when the access door 12 is attached to the camera 10, whereby the first and second members are concentrically attached together. As best illustrated in FIG. 5, the electrical lead 44 coming from the keyboard 14 passes down through a second through-extending aperture 54 which defines the hollow interior of the second tubular hollow member 50, and it is then directed into electrical communication with the light emitting diode array 28.

As to a further discussion of the manner of usage and operation of the present invention, the same should be apparent from the above description. However, a brief discussion of the manner of operation will be provided. In this connection, it can be seen that once the light emitting diode array 28 is magnetically attached along a bottom edge of the film guide frame 22, film may be positioned thereover whereby the light emitting diode array is located between the shutter of the camera 10 and the particular film frame aligned with the array. If a user of the camera 10 decides to take a picture of perhaps a mountain in Colorado, he need only to type in a descriptor, such as "mountain-Colorado" and this descriptor will be illuminated and displayed on the light emitting diode array 28. The light emanating from the light emitting diode array 28 will expose the bottom edge of the film frame lying thereover, whereby the descriptor is permanently imprinted on the film, and the light shield strips 40, 42 prevent this light from exposing any of the remaining film frame. The keyboard 14 is then cleared and turned off, and the user of the camera 10 may then take a picture of the mountain whereby the remaining unexposed portion of the film frame records the picture, with the printed photograph then showing both the mountain and the descriptor in a now understood manner. A basic novel feature of the present invention is the fact that the descriptor information can be entered on the film well in advance of taking a picture, thereby to actually expedite the picture taking process.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the united states is as follows:

1. An improved roll film camera comprising in combination:

a film processing compartment in said camera with a selectively openable access door;

photographic film guiding means mounted within said film processing compartment, said photographic film guiding means being operable to guide and retain film frames to receive an exposure from a camera shutter mechanism;

electronic light emitting means for imprinting chosen data on a film frame positioned within said photographic film guiding means, said electronic light emitting means being removably mounted proximate a bottom edge of said film frame so as to be in a position to imprint said data on an edge of said film frame, said electronic light emitting means being further provided with an adjustable first light shield means to prevent data generating light from exposing remaining portions of said film frame, whereby damage to a photograph due to overexposure is prevented;

electronic programming means for selecting and transmitting said data to said electronic light emitting means;

wherein said electronic programming means comprises a keyboard operably mounted to an exterior surface of said access door, whereby a user can select and input data to said electronic light emitting means when said access door is closed and said roll film compact camera is being utilized to take pictures;

wherein said electronic light emitting means inputs data to said film frame prior to a shutter opening on said roll film compact camera;

second light shield means, said second light shield means including said electronic light emitting means, whereby said electronic light emitting means is positioned between said shutter and said edge of said film frame, thereby preventing overexposure of said edge of said film frame when said shutter is opened so as to expose a remaining portion of said film frame;

wherein said electronic light emitting means is removably positioned within said roll film compact camera by magnetic means designed to hold said electronic light emitting means in fixed engagement with said roll film compact camera.

2. The improved roll film compact camera as described in claim 1 and further wherein said first light shield means includes a use of a flexible deformable material along top and bottom edges of said electronic light emitting means, said material being slidably compressible against said film frame so as to further prevent excess light from contacting said edge of said film frame during an opening of said shutter.

3. The improved roll film compact camera as described in claim 2 and further wherein said first light shield means includes a positioning of light emitting diodes within a recess formed in said electronic light emitting means, thereby to prevent excess light from exposing said remaining portion of said film frame prior to an opening of said shutter.

4. The improved roll film compact camera as described in claim 3 and further wherein said electronic programming means is in electrical communication with said electronic light emitting means through an electrical connector directed therebetween, said electrical connector being positionable through a hinge means, said hinge means operating to hingedly connect said access door to said roll film compact camera.

5. The improved roll film compact camera as described in claim 4 and further wherein said hinge means includes a first hollow tubular member attached to said roll film compact camera and a second hollow tubular member mounted to said access door, said second hollow tubular member being concentrically and rotatably mounted within said first hollow tubular member, thereby to effect a hinged connection between said roll film compact camera and said access door, said electrical connector being directed from said electronic programming means through a hollow interior section of said second hollow tubular member and then into electrical communication with said electronic light emitting means.

* * * * *